United States Patent
Green et al.

(10) Patent No.: US 8,788,420 B1
(45) Date of Patent: Jul. 22, 2014

(54) GENERATING PEER-TO-PEER TRANSACTION RISK RATINGS

(71) Applicant: Google Inc., Mountain View, CA (US)

(72) Inventors: Travis Harrison Kroll Green, Washington, DC (US); Narelle Cozens, New York, NY (US); Avery Pennarun, New York, NY (US); Peter Schmitt, Jersey City, NJ (US); Michael DePasquale, Rutherford, NJ (US); Boris Mizhen, Brooklyn, NY (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/652,443

(22) Filed: Oct. 15, 2012

(51) Int. Cl.
*G06Q 20/40* (2012.01)
(52) U.S. Cl.
USPC .......................................................... 705/44
(58) Field of Classification Search
USPC .......................................................... 705/44
See application file for complete search history.

(56) References Cited

U.S. PATENT DOCUMENTS

| | | | |
|---|---|---|---|
| 7,174,382 B2 | 2/2007 | Ramanathan et al. | |
| 7,644,019 B2 | 1/2010 | Woda et al. | |
| 8,150,844 B2 | 4/2012 | Redstone et al. | |
| 8,326,769 B1 | 12/2012 | Weisman | |
| 8,332,314 B2 | 12/2012 | Griffin | |
| 8,515,791 B2 | 8/2013 | Woda et al. | |
| 8,621,215 B1 | 12/2013 | Iyer | |
| 2004/0128195 A1* | 7/2004 | Sorem | 705/14 |
| 2004/0230527 A1* | 11/2004 | Hansen et al. | 705/40 |
| 2008/0079539 A1 | 4/2008 | Daley et al. | |
| 2009/0119160 A1 | 5/2009 | Woda et al. | |
| 2009/0319940 A1 | 12/2009 | Flake et al. | |
| 2010/0069058 A1 | 3/2010 | Rothschild | |

(Continued)

FOREIGN PATENT DOCUMENTS

| | | |
|---|---|---|
| EP | 2179358 A1 | 2/2009 |
| EP | 2404264 | 9/2010 |

(Continued)

OTHER PUBLICATIONS

Kim, T., International Search Report and Written Opinion for International Application No. PCT/US2013/044565, pp. 1-13, Nov. 18, 2013.

(Continued)

*Primary Examiner* — Lindsay M. Maguire
(74) *Attorney, Agent, or Firm* — Johnson, Marcou & Isaacs, LLC

(57) ABSTRACT

The invention provides a computer-implemented method for generating a risk rating for a peer-to-peer transaction. The method comprises receiving a request to generate a risk rating for a proposed peer-to-peer financial transaction; identifying information associated with a plurality of previous peer-to-peer transactions of the payor; identifying one or more of the previous peer-to-peer transactions that are related to the proposed transaction; assigning a score to each of the related peer-to-peer transactions, the score being based at least in part on a determination of a level of success of each of the related peer-to-peer transactions; determining the risk rating for the proposed transaction based on the scores assigned to the transactions related to the proposed transaction; determining a payor risk rating for the payor; adjusting the risk rating for the proposed transaction based on the payor risk rating of the payor; and presenting the risk rating for the proposed transaction.

16 Claims, 5 Drawing Sheets

(56) References Cited

U.S. PATENT DOCUMENTS

| | | |
|---|---|---|
| 2010/0114776 A1 | 5/2010 | Weller et al. |
| 2010/0125490 A1 | 5/2010 | Kiciman et al. |
| 2010/0228664 A1* | 9/2010 | Peterson et al. ............... 705/38 |
| 2011/0099274 A1 | 4/2011 | Puthenkulam et al. |
| 2011/0131122 A1 | 6/2011 | Griffin et al. |
| 2011/0137789 A1 | 6/2011 | Kortina et al. |
| 2011/0187642 A1* | 8/2011 | Faith et al. .................... 345/158 |
| 2011/0189981 A1* | 8/2011 | Faith et al. ................. 455/414.1 |
| 2011/0191200 A1 | 8/2011 | Bayer et al. |
| 2011/0307340 A1 | 12/2011 | Bernmbarek |
| 2012/0150598 A1 | 6/2012 | Griggs |
| 2012/0150734 A1 | 6/2012 | Bangah et al. |
| 2012/0166267 A1 | 6/2012 | Beatty et al. |
| 2012/0190386 A1 | 7/2012 | Anderson |
| 2012/0233020 A1 | 9/2012 | Eberstadt et al. |
| 2012/0239479 A1 | 9/2012 | Amaro et al. |
| 2012/0239497 A1 | 9/2012 | Nuzzi |
| 2012/0278127 A1 | 11/2012 | Kirakosyan et al. |
| 2012/0303425 A1 | 11/2012 | Katzin et al. |
| 2013/0204744 A1 | 8/2013 | Grass et al. |
| 2013/0325592 A1 | 12/2013 | Woda et al. |

FOREIGN PATENT DOCUMENTS

| | | |
|---|---|---|
| KR | 10-1078173 B1 | 10/2011 |
| KR | 10-2012-0119813 A | 10/2012 |
| KR | 10-2012-0121452 A | 11/2012 |

OTHER PUBLICATIONS

Ouellette, J., Office Action issued in copending U.S. Appl. No. 13/402,853, filed Feb. 22, 2012, pp. 1-12, Aug. 14, 2013.

Kim, S., International Search Report and Written Opinion issued in International Application No. PCT/US2013/069759, pp. 1-10 Date, Mar. 11, 2014.

* cited by examiner

GENERATING PEER-TO-PEER TRANSACTION RISK RATINGS

TECHNICAL FIELD

The present disclosure relates generally to peer-to-peer transactions, and more particularly to generating counter-party risk ratings and transaction risk ratings.

BACKGROUND

Users of smartphones and other similar devices are conducting an increasing number of electronic transactions. While financial transactions with merchants have become much more user-friendly and commonplace, users are additionally employing their devices to conduct transactions with other mobile device users. These peer-to-peer ("P2P") transactions allow a user and a counter-party to conduct electronic transactions exclusive of a traditional credit card system or other related system. In addition, some small businesses and other merchants will accept a P2P transaction.

Conventional P2P transactions include some risk to the payment recipient, as the payment may not be completed if the payor does not have a funded account, cancels the transaction, has a fraudulent account, or for any other reason does not complete the transaction. A peer-to-peer transaction contains more of a risk than receiving cash from a payor, but may contain similar risks to receiving a check or a credit card payment.

The recipient must trust that a P2P transaction will be conducted, but must also trust that the transaction will be completed in a timely manner. The recipient wants a payment that will be received quickly after the transaction is initiated.

Credit card companies and other financial institutions employ various means of accessing the riskiness of a transaction with a payor. For example, a payor may have a credit rating that is generated from the collected payment history and other factors from the payor's financial history. The credit rating is generally only available to merchants or institutions to which the payor gives authorization. The credit rating assesses a risk history for the payor and does not assess risk for a particular transaction.

Users of P2P payment technology are desirous of a simpler and faster method of determining if a payment from the payor will be successfully completed. An example of a circumstance in which users may conduct this type of P2P transaction might be when two people dine together at a restaurant. If a user pays the restaurant for the bill, the other member of the party may desire to pay his share of the bill to the user. If the user is familiar with the payor, then the user may feel comfortable accepting the payment from the payor and that the transaction will be completed. However, if a third person with which the user is not familiar attends the meal, the user may desire to know if the transaction is likely to be successful before accepting a P2P payment. Conventional technologies do not provide this information.

In another example, a user may desire to sell an item to a payor, such as at a flea market or on an Internet commerce site such as CRAIGSLIST. In this environment, the user typically does not know the payor and would not have a manner of assessing the riskiness of conducting the transaction with a P2P payment. The user would like to know that a transaction has a high likelihood of being completed before giving the purchased item to the payor. Conventional technologies do not provide this information.

SUMMARY

Embodiments herein provide computer-implemented techniques for generating a risk rating for a peer-to-peer transaction. The method comprises receiving, using one or more computer devices, a request to generate a risk rating for a proposed peer-to-peer financial transaction, the request comprising information regarding at least a payment amount for the financial transaction and information identifying a payor for the financial transaction; identifying information associated with a plurality of previous peer-to-peer transactions of the payor; identifying one or more of the previous peer-to-peer transactions that are related to the proposed transaction based at least in part on the information in the request; assigning a score to each of the related peer-to-peer transactions, the score being based at least in part on a determination of a level of success of each of the related peer-to-peer transactions; determining the risk rating for the proposed transaction based on the scores assigned to the transactions related to the proposed transaction; determining a payor risk rating for the payor based at least in part on an analysis of a portion of the plurality of previous peer-to-peer transactions of the payor; adjusting the risk rating for the proposed transaction based on the payor risk rating of the payor; and presenting the risk rating for the proposed transaction.

Another aspect of the present invention provides a computer program product that is installed on a server located in a risk rating system to generate a risk rating for a peer-to-peer transaction. The computer program product includes a non-transitory computer-readable storage device having computer-readable program instructions stored therein. The computer-readable program instructions include computer program instructions for receiving a request to generate a risk rating for a proposed peer-to-peer financial transaction, the request comprising information regarding at least a payment amount for the financial transaction and information identifying a payor for the financial transaction; identifying information associated with a plurality of previous peer-to-peer transactions of the payor; identifying one or more of the previous peer-to-peer transactions that are related to the proposed transaction based at least in part on the information in the request; assigning a score to each of the related peer-to-peer transactions, the score being based at least in part on a determination of a level of success of each of the related peer-to-peer transactions; determining the risk rating for the proposed transaction based on the scores assigned to the transactions related to the proposed transaction; and presenting the risk rating for the proposed transaction.

These and other aspects, objects, features, and advantages of the example embodiments will become apparent to those having ordinary skill in the art upon consideration of the following detailed description of illustrated example embodiments, which include the best mode of carrying out the invention as presently presented.

DETAILED DESCRIPTION OF THE EXAMPLE EMBODIMENTS

Overview

Figure 1:
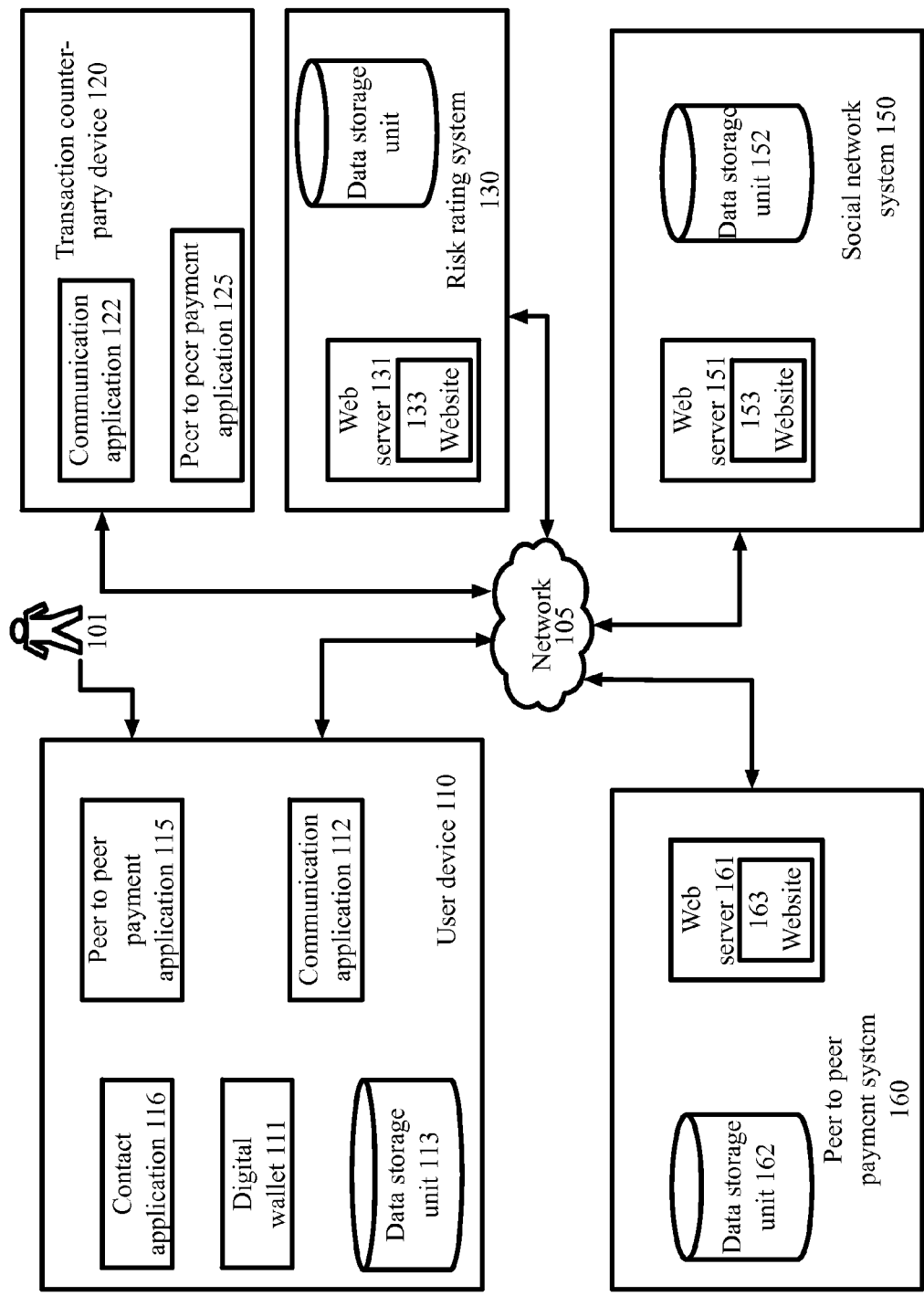
FIG. 1 is a block diagram depicting a system to generate a risk rating in a peer-to-peer transaction, in accordance with certain example embodiments.

Embodiments herein provide computer-implemented techniques for a risk rating system that can analyze the peer-to-peer ("P2P") transactions of a counter-party and determine a risk rating for that counter-party. Additionally, the risk rating system can analyze a proposed transaction involving the counter-party and determine a risk rating for that transaction.

The user can configure a user account on a P2P system to make P2P transactions with other users or merchants. The user associates one or more financial accounts with the P2P user account to transmit or receive money. The financial account may be a credit card account, debit card account, bank account, stored value card account, or any other suitable financial account. Additionally or alternatively, the financial account may be hosted and executed by the P2P system. The counter-party can configure a corresponding P2P account involving similar or identical elements.

A user can operate a P2P payment application on a user device, such as a mobile device, a personal computer, or other device. The P2P payment application allows the user to transfer and receive money with transaction counter-parties operating a P2P payment application. For example, the user can enter or select the account of the counter-party and transmit money to the counter-party with the P2P payment application or receive money from the counter-party. The counter-party can operate a similar application on a counter-party device.

The risk rating system can monitor the transactions of the user and the counter-party and store the transactions in a database. Additionally or alternatively, the risk rating system can access the user transactions and counter-party transactions on a database on the server of the P2P payment system or from any other system.

The risk rating system can analyze the transactions of the counter-party and determine the riskiness of conducting a transaction with the counter-party. For example, the risk rating system can determine how many of the attempted transactions were not completed and the reasons any transactions were not completed. In one example, if the counter-party did not have sufficient funds to complete a transaction, the risk rating system would consider the counter-party to be more of a risk. In another example, if the counter-party took a longer time than is typical to complete the transaction, the risk rating system would consider the counter-party to be more of a risk. In another example, if the counter-party disputes more transactions than is typical, the risk rating system would consider the counter-party to be more of a risk. If the counter-party completes more transactions than is typical in a timely fashion with minimal disputes, then the risk rating system would consider the counter-party to be less of a risk.

The risk rating system can examine the number and dollar values of the counter-party transactions. Typically, a counter-party that conducts more successful transactions will be determined to have a lower risk rating than a user that conducts fewer transactions. Additionally or alternatively, the risk rating system can use the value of the transactions involving the counter-party to determine the riskiness of the counter-party. For example, a counter-party that conducts higher value transactions than a similar counter-party that conducts lower value transactions would be considered less of a risk. The risk rating system can determine if the account of the counter-party is experiencing a significant trend in the value of the transactions. A downward trend in the value of the transactions may be an indication of an increased risk.

The risk rating system can use the analysis of the transactions to assign a score to the counter-party. For example, the scoring system may assign a score to each considered factor, such as failure rate, transaction value, value trends, dispute rate, or other suitable factors. The scores may be proportional to a percentage of transactions conforming to each factor. For example, a score for the dispute rate may be proportional to the percentage of total transactions that are disputed. The scores may be added together or averaged or in any other way combined to determine a counter-party risk rating. The risk rating system may additionally or alternatively score each transaction and combine the transaction scores to create the counter-party rating. The rating may be on a scale of 1-100, a letter grade scale, a thumbs-up or thumbs-down, or any other suitable rating system.

The counter-party risk rating can be provided to any suitable application or system for display or use. For example, a counter-party with a low risk rating may desire to have the rating displayed on a social network of the counter-party or other website. The counter-party risk rating can be supplied to the P2P payment system to be displayed to users that desire a transaction with the counter-party. The counter-party risk rating may be used by another rating system such as a credit rating system. Any other suitable system may use the counter-party risk rating. The risk rating system may require that the transmission of the counter-party risk rating be authorized by the counter-party.

To conduct a P2P transaction, a user installs a P2P payment application on a mobile user device. The P2P payment application can provide a user interface for entering configuration information and establishing an account. The user can utilize the P2P payment application to conduct peer-to-peer financial transactions. P2P transactions can be conducted between the user and a counter-party. The counter-party can be another consumer or a small business.

The user enters information into the P2P payment application including information to identify the counter-party and transaction details, such as an amount to pay to the counter-party. In certain example embodiments, the user may enter the counter-party's name or other identifying information, such as an email address or a phone number. The P2P payment application transmits the information and the transaction details to the server on a P2P payment system. In an alternate embodiment, the user may simply send the identity information and the transaction information directly to the P2P payment system via email, text, instant message, or any other type of communication available to the user.

In the example embodiment, the risk rating system can determine a risk rating for a given transaction involving the counter-party.

The risk rating system may receive the details of a transaction and request a risk rating for the transaction. A transaction risk rating can be a rating for the riskiness associated with the transaction from which a recipient can determine the likelihood that the transaction will be completed in a timely manner without a dispute or cancellation.

If a consumer or a merchant is being asked to accept a P2P transaction from a counter-party that is unfamiliar, the risk rating system can provide a score or other rating to indicate the riskiness of the transaction. For example, a user may be at lunch with a friend and a new acquaintance of the user. Before the user offers to pay for the bill and receive a P2P payment from the friend and the new acquaintance, the user may desire to know if the payment from the new acquaintance is risky.

The user may have a history with the friend and be capable of properly estimating the risk involved with the payment of the friend. However, the user may not have a history, or may have little history, with the new acquaintance and would prefer to know the risk involved.

In an example embodiment, the user can submit the details of the transaction and receive a transaction risk rating with or without the new acquaintance being aware of the riskiness evaluation.

In the example embodiment, the risk rating system can receive the details of a current or proposed transaction. The details may include the user, the counter-party, the transaction amount, the location of the transaction, the time and date of the transaction, and other suitable details.

The risk rating system can access the database of the counter-party's previous transactions and a generated counter-party risk rating if it has been previously determined. The risk rating system can analyze the previous transactions to identify trends and tendencies. The risk rating system can set a time limit on which transactions to analyze. For example, the risk rating system can examine the previous year's data, the data from the previous 6 months, or the data from any suitable length of time.

The risk rating system can determine which transactions were not successful. A non-successful transaction may have been cancelled, disputed, completed slowly, or in any other manner been identified as non-successful. The risk rating system can determine which transactions were related to the proposed transaction. For example, a transaction that was conducted for a similar value may be considered to be related to the proposed transaction. In another example, a transaction that was conducted for a similar product or service may be considered to be related to the proposed transaction. In another example, a transaction that was conducted with a similar recipient may be considered to be related to the proposed transaction. In another example, a transaction that was conducted in the same or similar location may be considered to be related to the proposed transaction.

By classifying transactions by the relatedness of each transaction to the proposed transaction, the risk rating system can more accurately determine the riskiness of the proposed transaction.

In an example, a counter-party makes many $20 transactions and few $500 transactions. In the example, half of the $500 transactions were identified as non-successful, but all of the $20 transactions were successful. If the proposed transaction were for $20 or less, then the risk rating system can determine that the riskiness of the transaction is low. If the proposed transaction is for $500 or more, then the risk rating system can determine that the riskiness of the transaction is high.

In another example, the risk rating system can determine that all of the transactions conducted by the counter-party while located in a restaurant were successful. The same user, however, had many non-successful transactions while located at a flea market. If the proposed transaction is being conducted at a restaurant, the risk rating system can determine that the riskiness of the transaction is low. If the proposed transaction is being conducted at a flea market, the risk rating system can determine that the riskiness of the transaction is high.

In another example, the risk rating system can determine that nearly all of the transactions of the counter-party with transaction counter-parties that appear frequently in the social graph of the counter-party are successful transactions. The social graph of the counter-party comprises the friends, family, associates, and others that make up the social network of the counter-party and the relatedness of the members of the social network. The social graph may comprise contacts on a contact databases, frequent email and text correspondents, related members on a social networking site, or other suitable members of the social graph of the counter-party. Transactions with other counter-parties that do not appear in the social graph of the user are more often non-successful. If the counter-party is in the social graph of the user, then the transaction can be determined to be less risky. Additionally, if the counter-party is in multiple segments of the user's social graph, then the transaction can be determined to be even less risky. If the counter-party is not in the social graph of the user, then the transaction can be determined to be more risky.

The risk rating system can additionally or alternatively calculate trends of the counter-party's previous transactions. For example, if the values of the transactions are getting smaller, then a proposed high value transaction may be determined to be more risky.

The risk rating system can additionally or alternatively identify a counter-party risk rating of the proposed counter-party. The risk rating system may have previously calculated a counter-party risk rating and may maintain the counter-party risk rating on a database of the risk rating system. When determining a transaction risk rating, the risk rating system can use the counter-party risk rating as a factor. For example, if a counter-party has a low counter-party risk rating, a transaction risk rating may be lower than a similar transaction involving a payor with a high counter-party risk rating. If a counter-party risk rating has not previously been generated, the risk rating system can generate the counter-party risk rating at the time of the generation of the transaction risk rating.

Using one or more of the described factors affecting the proposed transaction, the risk rating system can generate a transaction risk rating. For example, the transaction risk rating may be based solely on one factor, such as the trends of the counter-party's previous transaction, or a combination of factors, such as counter-party risk rating and the number of social graph connections with the counter-party. Any suitable combination of any or all of the described risk factors can be employed. Additionally or alternatively, other risk factors that have not been previously described can be used in conjunction with the described risk factors to more accurately determine a transaction risk rating. The transaction risk rating may be a calculated score based on scores assigned to one or more of the factors affecting the transaction risk. For example, the score may be on a 1-100 scale, a letter grade, a thumbs-up or thumbs-down, a percentage likelihood of success, or other suitable scoring system.

The transaction risk rating can be transmitted to the P2P payment system. The P2P payment system can use the transaction risk rating to determine whether to allow a transaction to be conducted. In one example, the P2P payment system can display the transaction risk rating to the user to allow the user to determine whether to continue with the transaction. The transaction risk rating can be transmitted to any suitable third party. For example, the transaction risk rating can be transmitted to a financial account system that is associated with the user account on the P2P payment system. The transaction risk rating can be presented to the user by the P2P payment system or can be transmitted to the user by the risk rating system.

Aspects of embodiments will be explained in more detail in the following description, read in conjunction with the figures illustrating the program flow.

Example System Architectures

Turning now to the drawings, in which like numerals indicate like (but not necessarily identical) elements throughout the figures, example embodiments of the invention are described in detail.

FIG. 1 is a block diagram a system to generate a risk rating in a peer-to-peer ("P2P") transaction, in accordance with certain example embodiments. As depicted in FIG. 1, the system 100 includes network devices 110, 120, 130, 150 and 160 that are configured to communicate with one another via one or more networks 105.

Each network 105 includes a wired or wireless telecommunication means by which network devices (including devices 110, 120, 130, 150, 160) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110, 120, 130, 150 and 160 includes a device having a communication module capable of transmitting and receiving data over the network 105. For example, each network device 110, 120, 130, 150 and 160 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, 130, 150 and 160 are operated by end-users or consumers, likely transaction counter-party users, financial account operators, social network system operators, and a peer-to-peer payment system operator, respectively.

The user 101 can use the communication application 112, such as a web browser application or a stand-alone application, to view, download, upload, or otherwise access documents or web pages via a distributed network 105. The network 105 includes a wired or wireless telecommunication system or device by which network devices (including devices 110, 120, 130, 150, and 160) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer based environment.

The user device 110 may include a digital wallet application module 111. The digital wallet application module 111 may encompass any application, hardware, software, or process the user device 110 may employ to assist the device to complete a purchase transaction. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 may include a P2P payment application 115. The P2P payment application 115 can interact with the communication application 112 or be embodied as a companion application of the communication application 112 and execute within the communication application 112. The P2P payment application 115 may further be embodied as a companion application of the digital wallet application module 111 and execute within the digital wallet application module 111. The P2P payment application 115 may employ a software interface that may open in the digital wallet module application 111 or may open in the communication application 112. The interface can allow the user 101 to configure the P2P payment application 115 and the user account on the P2P payment system 160.

The P2P payment application 115 can be used to send transaction requests to the P2P payment system 160 and receive an authorization request from the P2P payment system 160. The P2P payment system 160 that develops authorization requirement and prosecutes the transaction can include a set of computer-readable program instructions, for example, using JavaScript, that enable the P2P payment system 160 to interact with the P2P payment application 115.

The user device 110 includes a data storage unit 113 accessible by the P2P payment application 115 and the communication application 112. The example data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include one or more contact applications 116. A contact application 116 may be any program or application on the user device 110 or accessible by the user device 110 that maintains a list of contacts of the user that the P2P payment system 160 may access. Examples of contact applications 116 might include, but not be limited to, email applications, text applications, instant messaging, calendar invite lists, or contact databases such as OUTLOOK or ACT. The contacts from a contact application 116 may be prioritized by factors such as frequency of communication with user 101, the number of contact applications on which a particular contact appears, or any other prioritizing factors which may be extracted from the applications.

The P2P payment system 160 utilizes a web server 161. The P2P payment system server 161 may represent the computer implemented system that the P2P payment system 160 employs to configure user accounts, create and maintain user profiles, communicate with the social network system 150, and conduct transactions. The P2P payment system website 163 may represent any web-based interface that allows users to interact with the P2P payment system 160 to configure the user accounts and change account settings. The web server 161 can communicate with one or more social network systems 150, one or more transaction counter-party devices 120, a risk rating system 130, and a user device 110 via any available technologies. These technologies may include, but would not be limited to, an Internet connection via the network 105, email, text, instant messaging, or other suitable communication technologies. The P2P payment system 160 may include a data storage unit 162 accessible by the web server 161 of the P2P payment system 160. The data storage unit 162 can include one or more tangible computer-readable storage devices.

In alternate embodiments, some or all of the functions or actions of the P2P payment system 160 may be performed by the user device 110 or executed on the user device 110.

The social network system 150 utilizes a web server 151. The social network server 151 may represent the computer-implemented system that the social network system 150 employs to host the social network website 153 and all of the profiles and communities that use the social network website 153. The social network website 153 may represent any web-based community that allows users to interact over the Internet with others who typically share a common interest. Examples of the social network websites 153 that the user 101 may belong to or interact with may include, but would not be limited to, FACEBOOK, GOOGLE+, or LINKEDIN.

The social network system 150 may provide the P2P payment system 160 with a list of members of the user's online community. The social network system 150 may identify the potential transaction counter-party and establish the strength the connection with the user 101. This may be determined by factors that may apply to the structure of each particular social network system 150. For example, a social network system such as FACEBOOK may categorize members of the community as "friends" or "friends of friends" and LINKEDIN may categorize members as first, second, or third degree contacts.

The social network system server 151 can communicate with a P2P payment system 160 and user devices 110 via any available technologies. These technologies may include, but would not be limited to, an Internet connection via the network 105, email, text, instant messaging, or other suitable communication technologies. The social network system 150 may include a data storage unit 152 accessible by the server 151 of the social network system 150. The data storage unit 152 can include one or more tangible computer-readable storage devices.

The transaction counter-party device 120 may represent the devices with which the user 101 may conduct a peer-to-peer transaction. Like the user device 110, the transaction counter-party device 120 may be a mobile device, (for example, notebook computer, tablet computer, netbook computer, personal digital assistant (PDA), video game device, GPS locator device, cellular telephone, smartphone, or other mobile device), personal computer, or other appropriate technology that includes or is coupled to a web browser application module 112, such as GOOGLE'S CHROME, MICROSOFT'S INTERNET EXPLORER, or MOZILLA'S FIREFOX.

The transaction counter-party device 120 may include a P2P payment application 125, a counterpart to P2P payment application 115, or a compatible transaction application that will allow transactions with the user device 110. The transaction counter-party device 120 may include a communication application 122. The counter-party can use the communication application 122, such as a web browser application or a stand-alone application, to view, download, upload, or otherwise access documents or web pages via a distributed network 105.

The risk rating system 130 may employ a web server 131 and a website 133. The risk rating system 130 represents a system that can analyze the transaction history of a user 101 or counter-party, the social network of a user 101 or counter-party, or other data and generate a user risk rating and a transaction risk rating. The risk rating system 130 can transmit the risk ratings to the P2P payment system 160, the social network system 150, the user device 110, or any other suitable recipient. The risk rating system 130 can transmit the risk ratings by any available technology including, but not limited to, an Internet connection via the network 105, email, text, instant messaging, or other suitable communication technologies. The risk rating system 130 may include a data storage unit 132 accessible by the server 131 of the risk rating system 130. The data storage unit 132 can include one or more tangible computer-readable storage devices.

It will be appreciated that the network connections shown are example and other means of establishing a communications link between the computers and devices can be used. Moreover, those having ordinary skill in the art having the benefit of the present disclosure will appreciate that the user device 110, transaction counter-party device 120, risk rating system 130, social network system 150, and P2P payment system 160 illustrated in FIG. 1 can have any of several other suitable computer system configurations. For example, a user device 110 embodied as a mobile phone or handheld computer may not include all the components described above.

Example Processes

The components of the example operating environment 100 are described hereinafter with reference to the example methods illustrated in FIG. 2.

Figure 2:
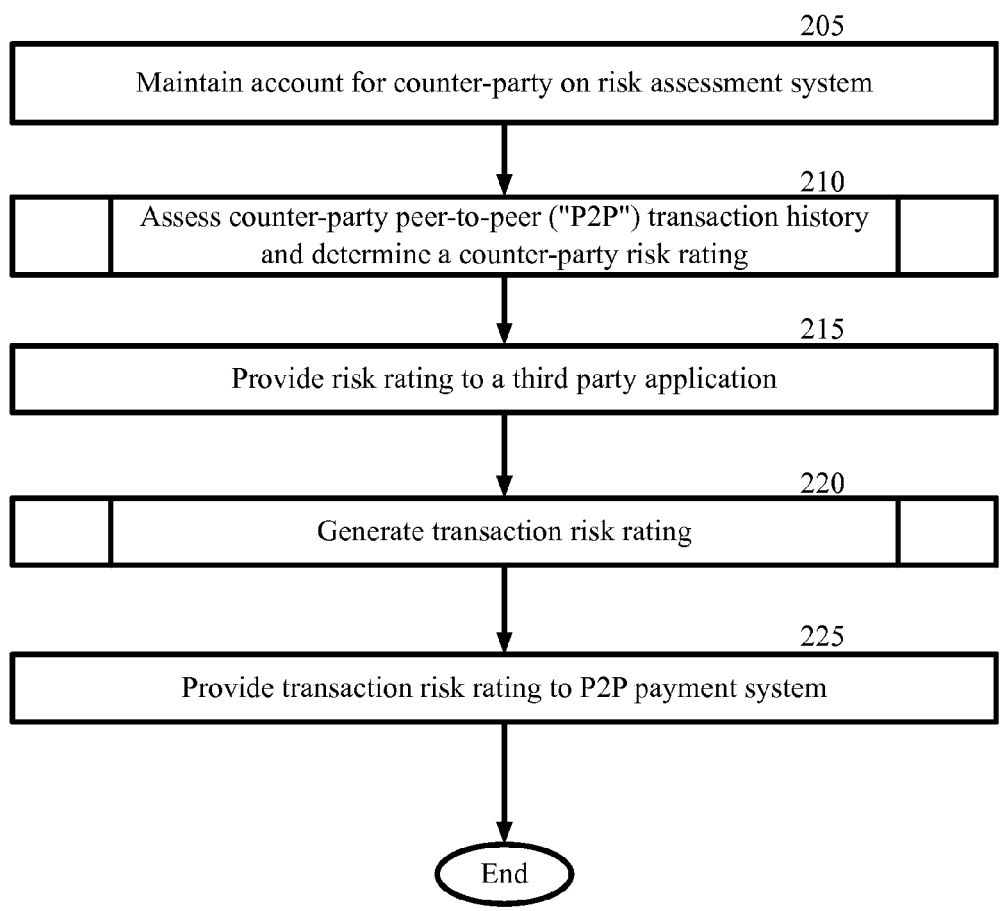
FIG. 2 is a block flow diagram depicting a method to provide a counter-party risk rating and a transaction risk rating in a peer-to-peer transaction, in accordance with certain example embodiments.

FIG. 2 is a flow chart depicting a method 200 for a risk rating system 130 to provide a transaction risk rating and a counter-party risk rating to a user 101, in accordance with certain example embodiments.

With reference to FIGS. 1 and 2, in block 205, the risk rating system 130 maintains an account for the counter-party. The risk rating system 130 can additionally or alternatively maintain an account for the user 101. The risk rating system 130 can employ the web server 131 or the website 133 of the risk rating system 130 to communicate with the counter-party to configure and maintain the counter-party account.

In block 210, the risk rating system 130 can determine a counter-party risk rating based on the transaction history of the counter-party. The method for the risk rating system 130 to generate the counter-party risk rating is discussed in greater detail in method 210 in FIG. 3.

Figure 3:
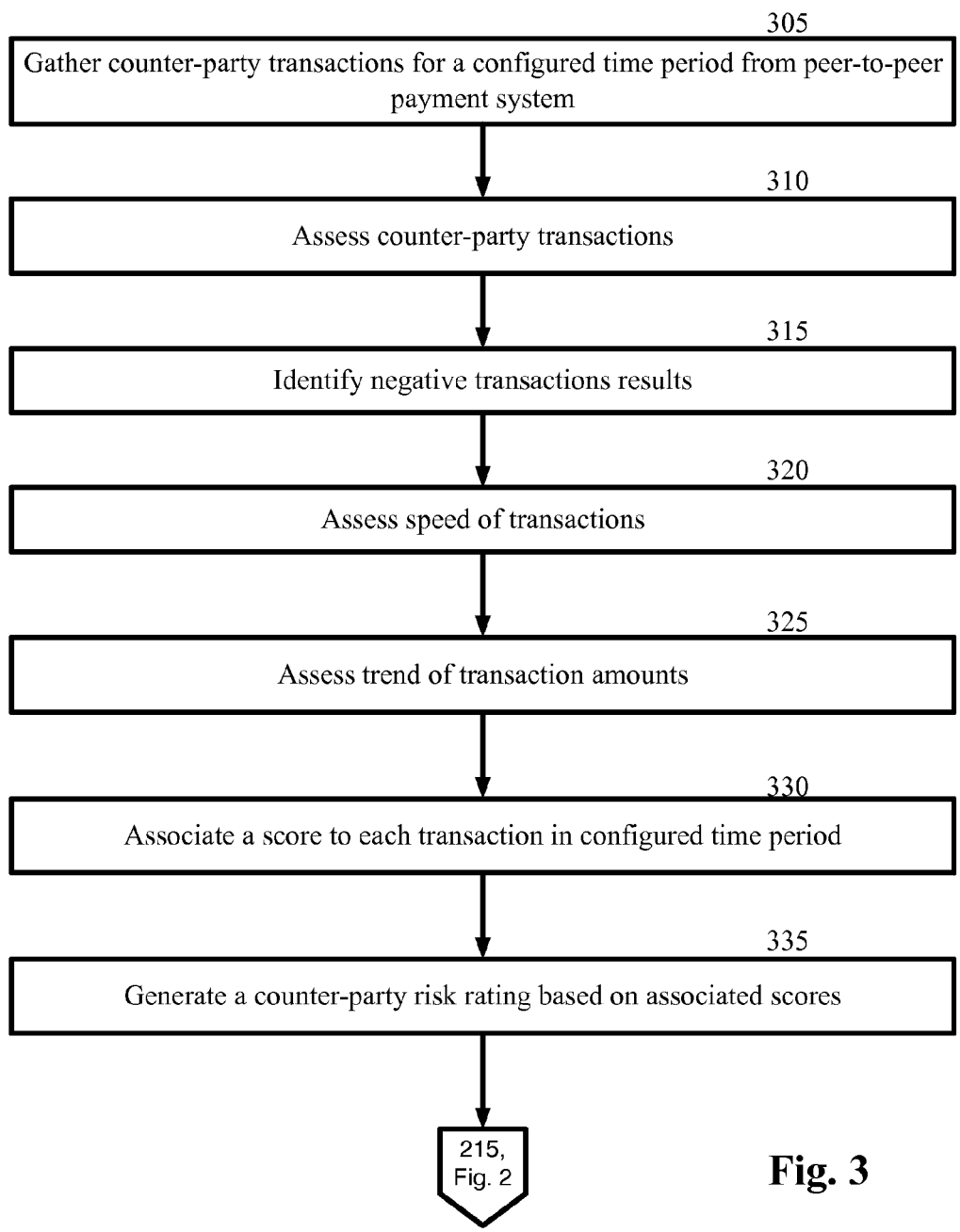
FIG. 3 is a block flow diagram depicting a method for generating a counter-party risk rating, in accordance with certain example embodiments.

FIG. 3 is a block flow diagram depicting a method 210 for generating a counter-party risk rating. In block 305, the risk rating system 130 gathers the transactions of the counter-party for a configured time period. The risk rating system 130 may query a database or other storage application on the P2P payment system 160 for the transaction data. The P2P payment system 160 can transmit the requested transactions to the risk rating system 130 via an Internet connection over the network 105, email, text, or any other suitable application.

In an alternate embodiment, the risk rating system 130 can maintain a database of transaction of the counter-party. The risk rating system 130 can obtain the transactions from the P2P payment system 160 or other suitable sources. The risk rating system 130 can obtain the transactions at the time of each transaction or on a set schedule, such as one a day or once a week. If the risk rating system 130 maintains a database of counter-party transactions, the risk rating system 130 can use the database to assess the counter party transactions.

In block 310, the risk rating system 130 can analyze the transactions of the counter-party and determine the riskiness of conducting a transaction with the counter-party. The risk rating system 130 can isolate the transactions that transpired during the selected time period. The time period may be limited to the previous month, year, or any other configured time period.

In block 315, the risk rating system 130 can identify transactions that had a negative result. For example, the risk rating system 130 determine that a transaction had a negative result if the transaction was never completed. In this example, the counter-party may not have sufficient funds to complete a transaction or the counter-party or the recipient may have cancelled the transaction. In another example, if the counter-party or the recipient disputes a transaction, the risk rating system 130 may determine that the transaction had a negative result. Any other negative result can be identified by the risk rating system 130.

In block 320, the risk rating system 130 can identify transactions that took a longer time than is typical to complete. The transaction may have taken an abnormally long amount of time to complete if the counter-party was slow to supply the funds for the transaction, if the counter-party had a slow payment mechanism, if the counter-party delayed confirming the transaction, or for any other reason the transaction was delayed.

In block 325, the risk rating system 130 can determine a trend of the transactions of the counter-party. The risk rating system can determine if the account of the counter-party is experiencing a significant trend in the value of the transactions. A downward trend in the value of the transactions may be an indication of an increased risk.

In block 330, the risk rating system 130 can use the analysis of the transactions to assign a score to the counter-party. For example, the risk rating system 130 may assign a score to each considered factor, such as failure rate, transaction values, value trends, dispute rate, or other suitable factors. The scores may be proportional to a percentage of transactions conforming to each factor. For example, a score for the dispute rate may be proportional to the percentage of total transactions that are disputed.

The scores may be added together or averaged or in any other way combined to determine a counter-party risk rating. The risk rating system 130 may additionally or alternatively score each transaction and combine the transaction scores to create the counter-party rating. The rating may be on a scale of 1-100, a letter grade scale, a thumbs-up or thumbs-down, or any other suitable rating system.

The counter-party risk rating may be provided as a risk rating or as a trustworthiness rating. For example, a 100 score in a 1-100 scoring system may indicate a perfect level of trust for a rating. Alternatively, a 100 score in a 1-100 scoring system may indicate a highest possible riskiness level.

The score assigned to the counter-party can be proportional to the percentage of transactions that are non-successful. For example, if the counter-party completes a higher percentage of transactions than is typical in a timely fashion with no disputes, then the risk rating system 130 would consider the counter-party to be less of a risk.

In another example, the risk rating system 130 can also examine the total number the transactions. Typically, a counter-party that conducts more successful transactions will be determined to have a lower risk rating than a user that conducts fewer transactions and have a better score.

In another example, the risk rating system 130 can use the value of the transactions involving the counter-party to assign a score. For example, a counter-party that conducts higher value transactions than a similar counter-party that conducts lower value transactions would be receive a higher score.

The risk rating system 130 can use the results of the trend analysis to affect the score. For example, a trend that is decreasing in value can cause the risk score to increase proportionally.

In block 335, the risk rating system 130 can assign a counter-party risk rating. The risk rating can be the score determined from the transaction analysis. Alternatively, the risk rating may be proportional to the score. For example, in a 1-100 scoring system, a score of 1-20 may be converted to a text rating of "Very Small Risk" or a thumbs-up or other suitable rating. A score of 80-100 may be converted to a text rating of "High Risk" or a thumbs-down or other suitable rating.

From block 335, the method 210 returns to block 215 of FIG. 2.

Returning to FIG. 2, in block 215, the risk rating system 130 can transmit the counter-party risk rating to a third party application. For example, a counter-party with a low risk rating may desire to have the rating displayed on a social network of the counter-party. The counter-party risk rating can be supplied to the P2P payment system to be displayed to users that desire a transaction with the counter-party. The counter-party risk rating may be used by another rating system such as a credit rating system. Any other suitable system may use the counter-party risk rating. The risk rating system 130 may require that the transmission be authorized by the counter-party.

In block 220, a user 101 or a system, such as the P2P payment system 160, can request a transaction risk rating. The risk rating system 130 can generate a risk rating for the requested transaction and transmit the transaction risk rating. The method of block 220 is described in greater detail in method 220 of FIG. 4.

Figure 4:
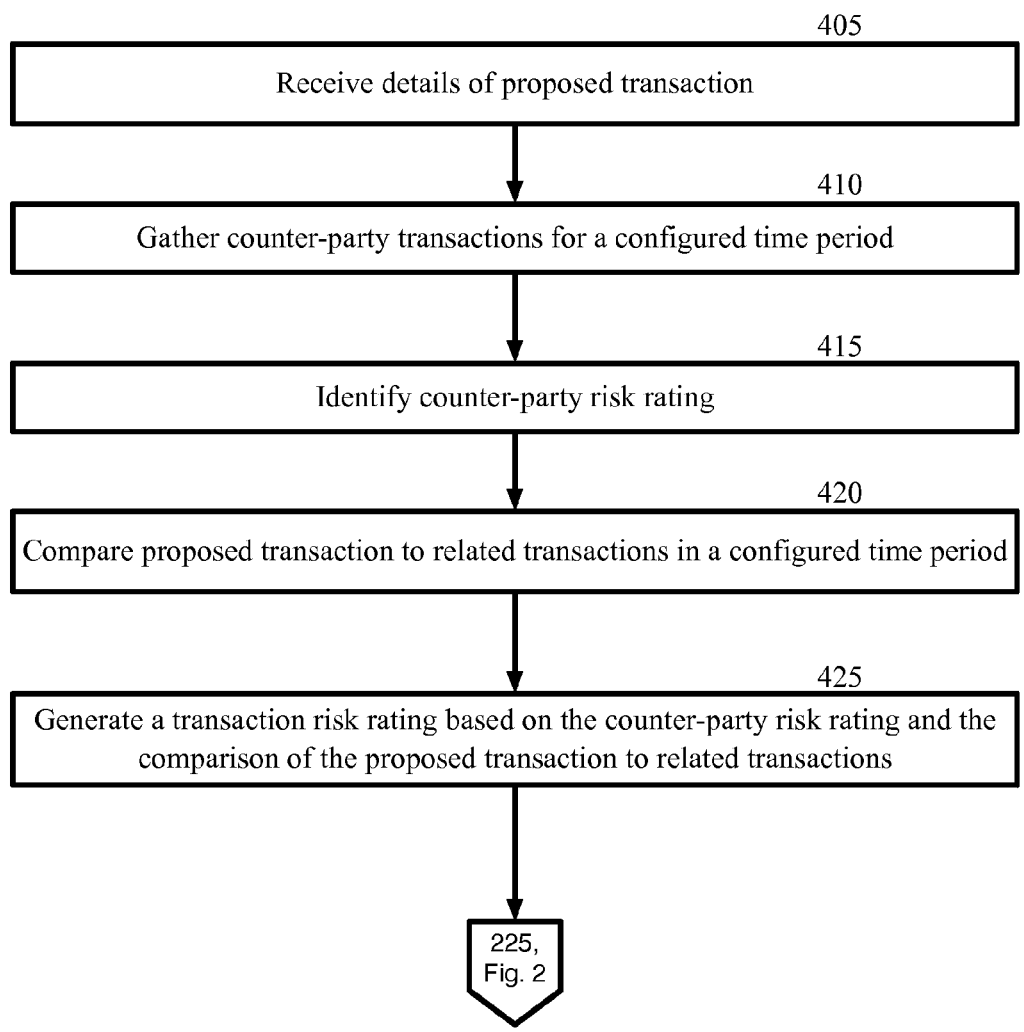
FIG. 4 is a block flow diagram depicting a method for generating a transaction risk rating, in accordance with certain example embodiments.

FIG. 4 is a block flow diagram depicting a method for generating a transaction risk rating. In block 405, the request may be submitted by the interested party at the time of a transaction. The request may additionally or alternatively be submitted at a time before a transaction or simply as an informational request regarding a potential transaction. The risk rating system 130 can receive the request to generate a risk rating for the proposed transaction. The request can be sent to the risk rating system 130 via any available technology including, but not limited to, an Internet connection via the network 105, email, text, instant messaging, or other suitable communication technologies In block 410, the risk rating system 130 gathers the transactions of the counter-party for a configured time period. For example, the risk rating system 130 can gather the previous year's worth of data, the data from the last 6 months, or the data from any suitable length of time.

The risk rating system 130 may query a database or other storage application on the P2P payment system 160 for the transaction data. The P2P payment system 160 can transmit the requested transactions to the risk rating system 130 via an Internet connection over the network 105, email, text, or any other suitable application.

In an alternate embodiment, the risk rating system 130 can maintain a database of transactions of the counter-party. The risk rating system 130 can obtain the transactions from the P2P payment system 160 or other suitable sources. The risk rating system 130 can obtain the transactions at the time of each transaction or on a set schedule, such as one a day or once a week. If the risk rating system 130 maintains a database of counter-party transactions, the risk rating system 130 can use the database to assess the counter party transactions.

In block 415, the risk rating system 130 identifies a counter-party risk rating if such a rating has been generated for the selected counter-party. If a counter-party risk rating has not been generated by the risk rating system 130, then an alternative counter-party risk rating may be employed. For example, a standard credit rating may be obtained from a credit rating agency or other suitable rating of the riskiness of the counter-party may be used. If a counter-party risk rating has not previously been generated, the risk rating system 130 can generate the counter-party risk rating at the time of the generation of the transaction risk rating.

In block 420, the risk rating system 130 can analyze the previous transactions to look for trends and tendencies. The risk rating system can set a time limit on which transactions to analyze. For example, the risk rating system 130 can examine the previous year's data, the data from the previous 6 months, or the data from any suitable length of time.

The risk rating system 130 can determine which transactions were not successful. A non-successful transaction may have been cancelled, disputed, completed slowly, or in any other manner been identified as non-successful.

The risk rating system 130 can determine which transactions were related to the proposed transaction. For example, a transaction that was conducted for a similar value may be considered to be related to the proposed transaction. In another example, a transaction that was conducted for a similar product or service may be considered to be related to the proposed transaction. In another example, a transaction that was conducted with a similar recipient may be considered to be related to the proposed transaction. In another example, a transaction that was conducted in the same or similar location may be considered to be related to the proposed transaction.

By classifying transactions by the relatedness of each transaction to the proposed transaction, the risk rating system 130 can more accurately determine the riskiness of the proposed transaction.

In an example, a counter-party makes many $20 transactions and a few $500 transactions. In the example, half of the $500 transactions were identified as non-successful, but all of the $20 transactions were successful. If the proposed transaction were for $20 or less, then the risk rating system 130 can determine that the riskiness of the transaction is low. If the proposed transaction is for $500 or more, then the risk rating system 130 can determine that the riskiness of the transaction is high.

In another example, the risk rating system 130 can determine that most of the transactions conducted by the counter-party while located in a restaurant were successful. The same user, however, had many non-successful transactions while located at a flea market. If the proposed transaction is being conducted at a restaurant, the risk rating system 130 can determine that the riskiness of the transaction is low. If the proposed transaction is being conducted at a flea market, the risk rating system can determine that the riskiness of the transaction is high.

In another example, the risk rating system 130 can determine that nearly all of the transactions of the counter-party with transaction counter-parties that appear frequently in the social graph of the counter-party are successful transactions. The social graph of the counter-party comprises the friends, family, associates, and others that make up the social network of the counter-party and the relatedness of the members of the social network. The social graph may comprise contacts on a contact databases 116, frequent email and text correspondents, related members on a social networking site 153, or other suitable members of the social graph of the counter-party. Transactions with other counter-parties that do not appear in the social graph of the user are more often non-successful. If the counter-party is in the social graph of the user, then the transaction can be determined to be less risky. Additionally, if the counter-party is in multiple segments of the user's social graph, then the transaction can be determined to be even less risky. If the counter-party is not in the social graph of the user, then the transaction can be determined to be more risky.

The risk rating system 130 can additionally or alternatively calculate trends of the counter-party's previous transactions. For example, if the values of the transactions are getting smaller and smaller, then a proposed high value transaction may be determined to be more risky.

When determining a transaction risk rating, the risk rating system 130 can use the counter-party risk rating as a factor. For example, if a counter-party has a low user risk rating, a transaction risk rating may be lower than a similar transaction involving a payor with a high user risk rating.

In block 425, using one or more of the described factors affecting the proposed transaction, the risk rating system 130 can generate a transaction risk rating. The transaction risk rating may be based solely on one factor, such as the trends of the counter-party's previous transaction, or a combination of factors, such as counter-party risk rating and the number of social graph connections with the counter-party. Any suitable combination of any or all of the described risk factors can be employed. Additionally or alternatively, other risk factors that have not been previously described can be used in conjunction with the described risk factors to more accurately determine a transaction risk rating. The transaction risk rating may be a calculated score based on scores assigned to one or more of the factors affecting the transaction risk. A score may be assigned to each transaction in the selected history of the counter-party. The scores may be summed or averaged into a transaction risk rating or in any other suitable manner associated with a transaction risk rating. Other factors, such as the value trends, the relatedness of the counter-party to the user in the social graph of the counter-party, or any other factor, can be used to change or alter the transaction risk rating. The score may be on a 1-100 scale, a letter grade, a thumbs-up or thumbs-down, a percentage likelihood of success, or other suitable scoring system.

From block 425, the method 220 returns to block 225 in FIG. 2.

Returning to FIG. 2, in block 225, the risk rating system 130 can transmit the transaction risk rating to the P2P payment system 160. The P2P payment system 160 can use the transaction risk rating to determine whether to allow a transaction to be conducted. In one example, the P2P payment system 160 can display the transaction risk rating to the user 101 to allow the user 101 to determine whether to continue with the transaction. The transaction risk rating can be transmitted to any suitable third party. For example, the transaction risk rating can be transmitted to a financial account system that is associated with the user account on the P2P payment system 160. The transaction risk rating can be transmitted directly to a user 101 upon request via email, text, an Internet application over the network 105, or any other available transmission method. The transaction risk rating can be transmitted to any other suitable party.

After receiving the transaction, the P2P payment system 160, the user 101, or any other recipient can decide whether to conduct the proposed transaction.

After completion of the transaction, the method 200 ends.

Other Example Embodiments

Users may, in appropriate circumstances, limit or otherwise affect the operation of the features disclosed in the specification. For example, notice may be provided and/or consent may be obtained from users regarding collection or use of certain data or the activation of certain features. In addition, a user may change the manner in which the features are employed, including for situations in which a user may have concerns regarding his privacy. Instructions may be provided to notify the users regarding policies about the use of information, including personally identifiable information and receipt information, and manners in which the users may affect such use of information. Thus, information can be used to benefit a user, if desired, through receipt of relevant advertisements, offers, or other information, without risking disclosure of personal information or the user's identity.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Figure 5:
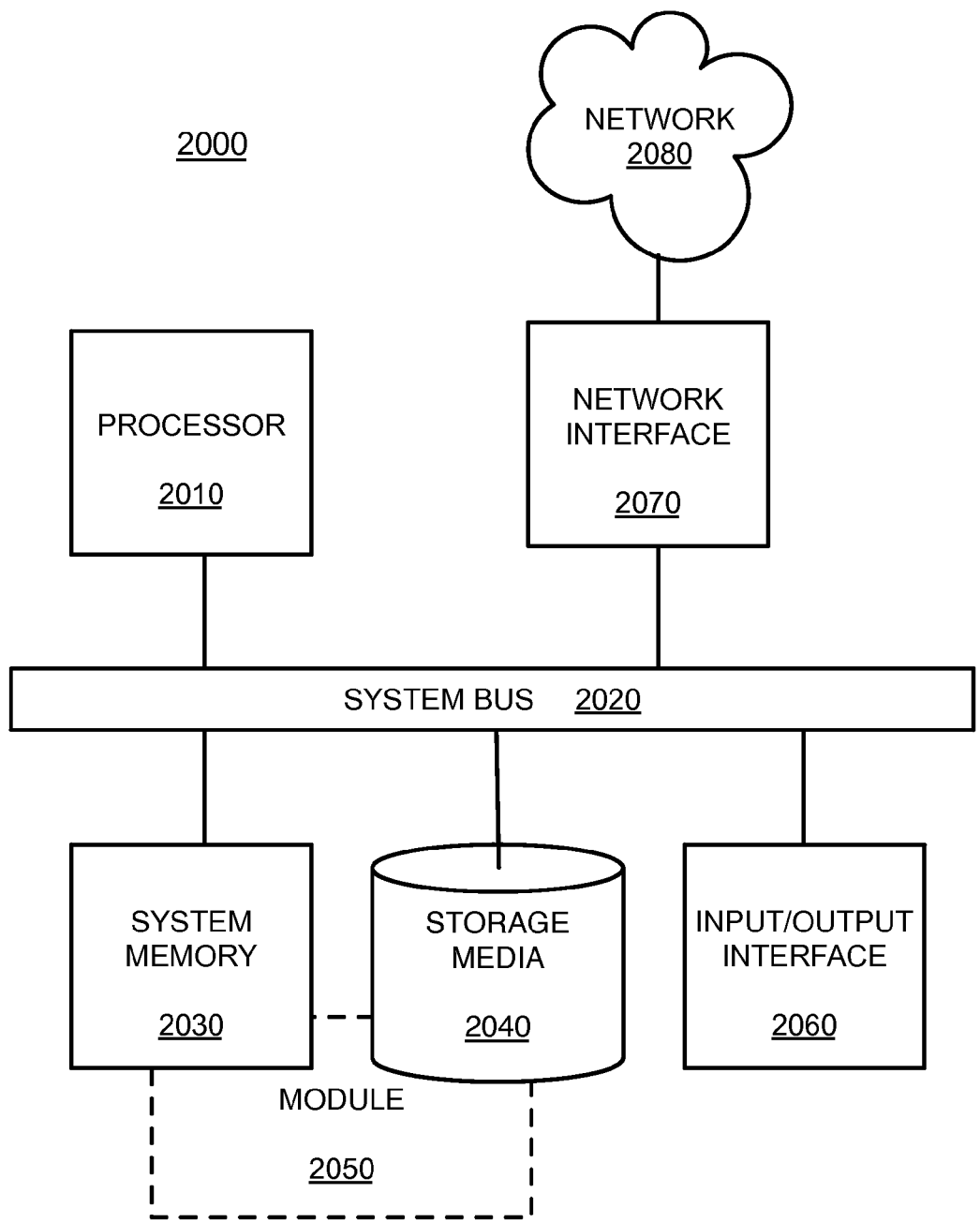
FIG. 5 is a block diagram depicting a computing machine and a module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

What is claimed is:

1. A computer-implemented method to generate transaction risk ratings, comprising:

receiving, using one or more computing devices, a request to generate a risk rating for a proposed peer-to-peer financial transaction, the request comprising information regarding at least a payment amount for the financial transaction and information identifying a payor for the financial transaction;

identifying, using the one or more computing devices, information associated with a plurality of previous peer-to-peer transactions of the payor;

identifying, using the one or more computing devices, one or more of the previous peer-to-peer transactions that are related to the proposed transaction based on one or more factors comprising the information in the request;

assigning, using the one or more computing devices, a score to each of the related peer-to-peer transactions, the score being based on one or more factors comprising a determination of a level of success of each of the related peer-to-peer transactions;

determining, using the one or more computing devices, the risk rating for the proposed transaction based on the scores assigned to the transactions related to the proposed transaction;

determining, using the one or more computing devices, a payor risk rating for the payor based on one or more factors comprising an analysis of a portion of the plurality of previous peer-to-peer transactions of the payor;

adjusting, using the one or more computing devices, the risk rating for the proposed transaction based on the payor risk rating of the payor;

determining, using the one or more computer devices, a strength of social graph connections of the payor to a payee, the strength based on one or more factors comprising a number of segments of the social graph of the payee in which the payor appears and a closeness of a connection between the payor and the payee in the segments of the social graph of the payee in which the payor appears, wherein a higher number of segments in which the payor appears is an indication of a higher strength, and a closer connection on a segment of the social graph of the payee is an indication of a higher strength;

adjusting, using the one or more computer devices, the risk rating for the proposed financial transaction based on one or more factors comprising the strength of the social graph connections; and providing for display, using the one or more computer devices, the risk rating for the proposed transaction.

2. The computer-implemented method of claim 1, wherein the one or more of the previous peer-to-peer transactions are identified as being related to the proposed transaction if the proposed transaction and the one or more previous transactions comprise one or more of a similar transaction counterparty, a similar merchant location, a similar transaction value, and a similar product being purchased.

3. The computer-implemented method of claim 1, wherein the determination of the level of success of each of the related peer-to-peer transactions is based on one or more factors comprising one or more of a completion of the transaction, a speed of the transaction, and a dispute of the transaction.

4. The computer-implemented method of claim 1, wherein the determination of the risk rating for the proposed transaction based on the scores assigned to the transactions related to the proposed transaction is calculated by averaging the scores assigned to the transactions related to the proposed transaction.

5. The computer-implemented method of claim 1, wherein the determination of the risk rating for the proposed transaction based on the scores assigned to the transactions related to the proposed transaction is calculated by a weighted average of the scores assigned to the transactions related to the proposed transaction, transactions that are more similar to the proposed transaction being weighted more heavily in the weighted average compared to transaction that are less similar to the proposed transaction.

6. The computer-implemented method of claim 1, wherein presenting the risk rating for the proposed transaction comprises communicating the risk rating for the proposed transaction to a user computing device of a payee for display via the user computing device of the payee.

7. A computer program product, comprising:
a non-transitory computer-readable storage device having computer-executable program instructions embodied thereon that when executed by a computer generates a transaction risk rating, the computer-executable program instructions comprising:
computer-executable program instructions for receiving a request to generate a risk rating for a proposed peer-to-peer financial transaction, the request comprising information regarding at least a payment amount for the financial transaction and information identifying a payor for the financial transaction;
computer-executable program instructions for identifying information associated with a plurality of previous peer-to-peer transactions of the payor;
computer-executable program instructions for identifying one or more of the previous peer-to-peer transactions that are related to the proposed transaction based on one or more factors comprising the information in the request, wherein the one or more of the previous peer-to-peer transactions are identified as being related to the proposed transaction if the proposed transaction and the one or more previous transactions comprise one or more of a similar transaction counterparty, a similar merchant location, a similar transaction value, and a similar product being purchased;
computer-executable program instructions for assigning a score to each of the related peer-to-peer transactions, the score being based on one or more factors comprising a determination of a level of success of each of the related peer-to-peer transactions;
computer-executable program instructions for determining the risk rating for the proposed transaction based on the scores assigned to the transactions related to the proposed transaction; and
computer-executable program instructions for providing the risk rating of the proposed transaction to a computing device of a payee for display.

8. The computer program of claim 7, further comprising
computer-executable program instructions for determining a payor risk rating for the payor based on one or more factors comprising an analysis of a portion of the plurality of previous peer-to-peer transactions of the payor; and
computer-executable program instructions for adjusting the risk rating of the proposed financial transaction based on the risk rating of the payor.

9. The computer program of claim 7, further comprising:
computer-executable program instructions for determining a strength of social network information connections of the payor to the payee, the strength based on one or more factors comprising a number of occurrences of the payee in the social network information of the payor, wherein a higher number of occurrences is an indication of a higher strength and a lower number of occurrences is an indication of a lower strength; and
computer-executable program instructions for adjusting the risk rating for the proposed financial transaction based on one or more factors comprising the strength of the social network information connections.

10. The computer program of claim 7, wherein the determination of the level of success of each of the related peer-to-peer transactions is based on one or more factors comprising one or more of a completion of the transaction, a speed of the transaction, and a dispute of the transaction.

11. The computer program of claim 7, wherein the determination of the risk rating for the proposed transaction based on the scores assigned to the transactions related to the proposed transaction is calculated by averaging the scores assigned to the transactions related to the proposed transaction.

12. The computer program of claim 7, wherein the determination of the risk rating for the proposed transaction based on the scores assigned to the transactions related to the proposed transaction is calculated by a weighted average of the scores assigned to the transactions related to the proposed transaction, transactions that are more similar to the proposed transaction being weighted more heavily in the weighted average compared to transaction that are less similar to the proposed transaction.

13. A system for generating a transaction risk rating, the apparatus comprising:
a storage resource;
a network module; and
a processor communicatively coupled to the storage resource and the network module, wherein the processor executes application code instructions that are stored in the storage resource and that cause the system to:
receiving from a user computing device of a payee a request to generate a risk rating for a proposed peer-to-peer financial transaction between a payor and the payee, the request comprising information regarding at least a payment amount for the financial transaction and information identifying the payor for the financial transaction;

identifying information associated with a plurality of previous peer-to-peer transactions of the payor;

identifying one or more of the previous peer-to-peer transactions that are related to the proposed transaction based on one or more factors comprising the information in the request;

assigning a score to each of the related peer-to-peer transactions, the score being based on one or more factors comprising a determination of a level of success of each of the related peer-to-peer transactions, wherein the determination of the risk rating for the proposed transaction is based on the scores assigned to the transactions related to the proposed transaction is calculated by a weighted average of the scores assigned to the transactions related to the proposed transaction, wherein transactions that have a greater number of similar features to the proposed transaction are weighted more heavily in the weighted average compared to transaction that are less similar to the proposed transaction;

determining the risk rating for the proposed transaction based on the scores assigned to the transactions related to the proposed transaction; and providing the risk rating of the proposed financial transaction to the user computing device of the payee for display via the user computing device of the payee.

14. The system of claim 13, the instructions further causing the system to:
  determining a payor risk rating for the payor based on one or more factors comprising an analysis of a portion of the plurality of previous peer-to-peer transactions of the payor; and
  adjusting the risk rating for the proposed transaction based on the payor risk rating of the payor.

15. The system of claim 13, the instructions further causing the system to:
  determining a strength of social network information connections of the payor to the payee, the strength based on one or more factors comprising a number of occurrences of the payee in the social network information of the payor, wherein a higher number of occurrences is an indication of a higher strength and a lower number of occurrences is an indication of a lower strength; and
  adjusting the risk rating for the proposed financial transaction based on one or more factors comprising the strength of the social network information connections.

16. The system of claim 13, wherein the one or more of the previous peer-to-peer transactions are identified as being related to the proposed transaction if the proposed transaction and the one or more previous transactions comprise one or more of a similar transaction counter-party, a similar merchant location, a similar transaction value, and a similar product being purchased.

* * * * *